April 23, 1963 J. J. RADOVITZ ETAL 3,086,735
CHAIN ARRESTING GEAR
Filed Oct. 19, 1961 4 Sheets-Sheet 1

INVENTOR.
JOHN J. RADOVITZ
BY RICHARD J. RYAN
HERBERT RAMBO
ATTORNEY

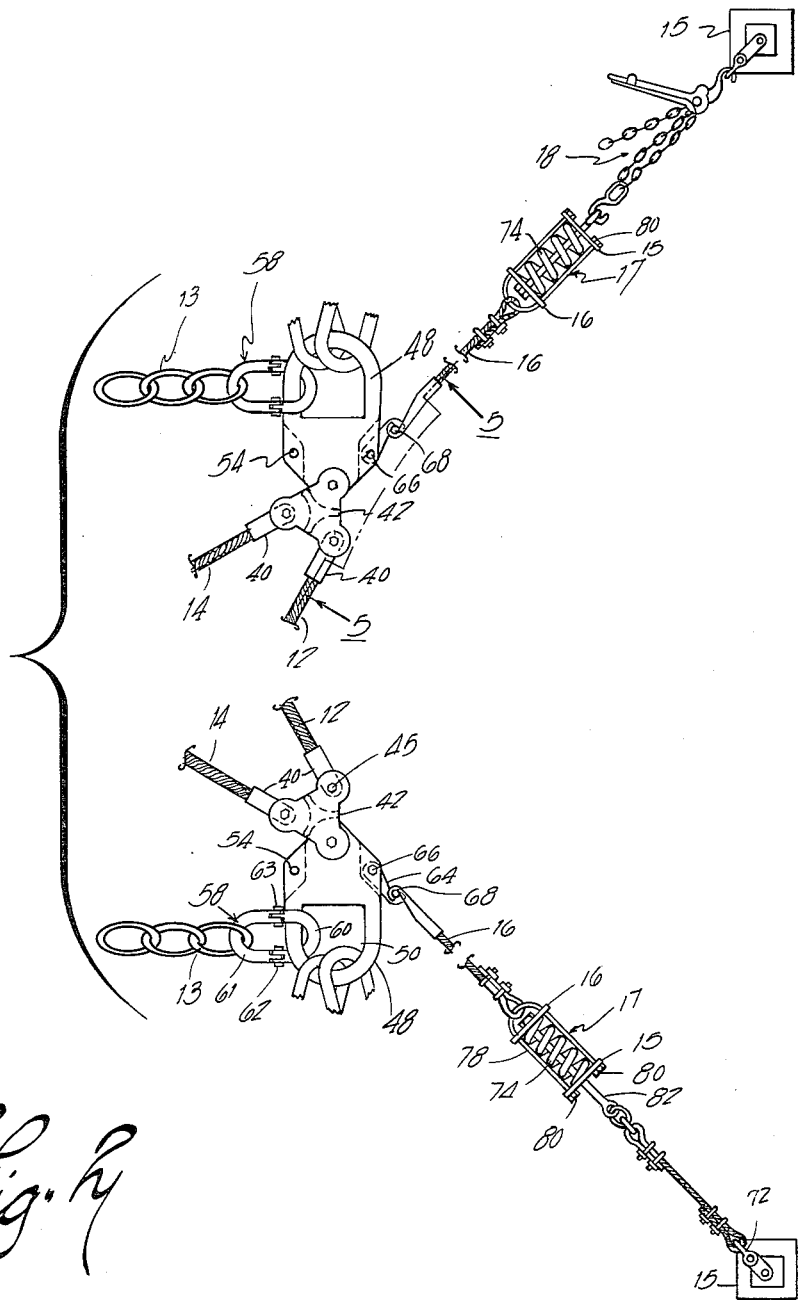

April 23, 1963   J. J. RADOVITZ ETAL   3,086,735
CHAIN ARRESTING GEAR
Filed Oct. 19, 1961   4 Sheets-Sheet 3
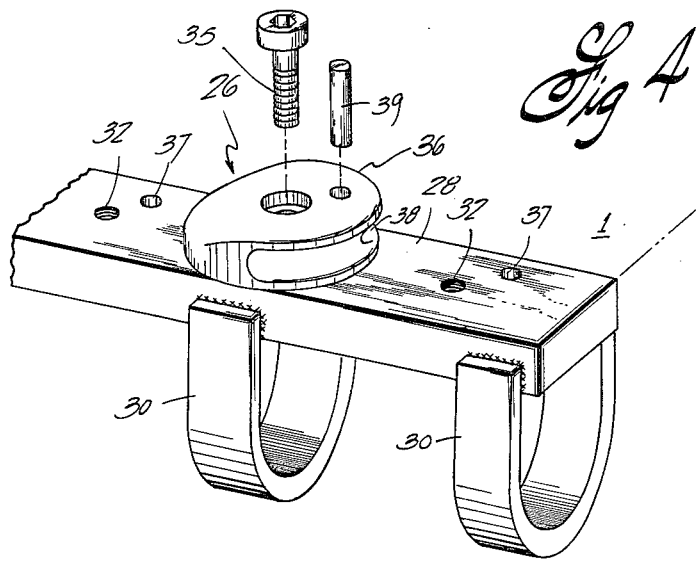
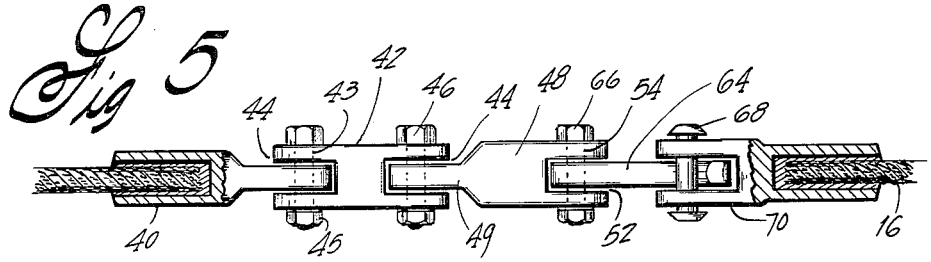
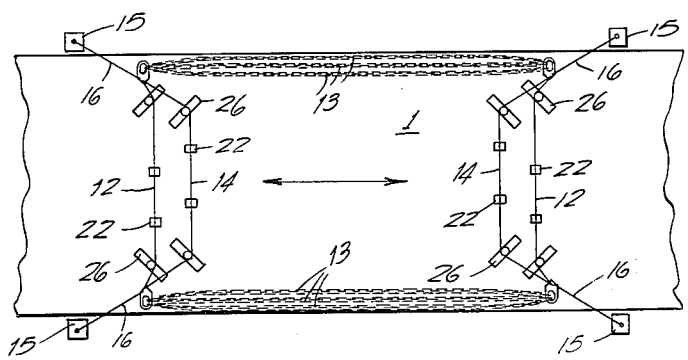
INVENTOR.
JOHN J. RADOVITZ
RICHARD J. RYAN
BY HERBERT RAMBO
Arthur L. Collins
ATTORNEY

INVENTOR.
JOHN J. RADOVITZ
BY RICHARD J. RYAN
HERBERT RAMBO

Arthur M. Collins
ATTORNEY

United States Patent Office 3,086,735
Patented Apr. 23, 1963

3,086,735
CHAIN ARRESTING GEAR
John J. Radovitz, Clifton Heights, and Richard J. Ryan, Chester, Pa., and Herbert Rambo, Oaklyn, N.J., assignors, by direct and mesne assignments, to the United States of America as represented by the Secretary of the Navy
Filed Oct. 19, 1961, Ser. No. 146,383
4 Claims. (Cl. 244—110)

This invention relates to means for arresting aircraft taking off or landing under emergency circumstances.

At times a pilot must abort a take-off. This decision is made so that there is sufficient runway remaining to furnish enough stopping distance for the aircraft using wheel brakes, aerodynamic braking, drag chutes, or other devices installed on the aircraft and under the pilot's control. In isolated instances, nevertheless, in addition to these brakes a ground assist is needed to stop the aircraft from rolling off the runway into a hazardous area. Similarly, in-flight emergency situations can arise from which the escape procedure possessing the least potential danger to the pilot is engagement with something on the landing surface.

Various types of arresting devices are available for providing the required arresting service which will alleviate the situations alluded to. The usual gear includes a tensioned cable or pendant stretched across the width of the runway which is adapted to be engaged by a hook trailing from the aircraft. The ends of the pendant are connected to energy absorbing machinery such as a plurality of reeved pulleys operating in conjunction with a hydraulic device having a piston and cylinder. Normally the energy absorbing machinery is massive, complicated and expensive. It requires frequent inspecting, considerable servicing and repair to keep it in operating condition and a large portion of it must be specially housed, as beneath the landing surface. For infrequent arrestments, as on emergency occasions, the cost alone is prohibitive.

Consequently, it is an object of this invention to provide an emergency arresting gear which is compact, simple, rugged, relatively inexpensive, and easily installed or disassembled.

A further object is to provide an emergency arresting gear which furnishes a progressively increasing force to give a steady deceleration to an aircraft being retarded on a landing surface.

Another object is to provide arresting gear in which an aircraft engaging it is coupled to a weight that it drags along the landing surface developing friction which assists in halting the aircraft.

A further object is to provide emergency arresting gear with a plurality of pendants which can be tensioned simultaneously and maintained at the desired tension.

Another object is to provide such gear which is adapted for bi-directional arresting.

Other objects and features of the invention will become apparent from the following detailed description of the invention when read in light of the accompanying drawings in which:

FIG. 2 is an enlarged view of portions of the gear along lines 2—2 of FIG. 1;

FIG. 4 is an enlarged perspective view of a pendant hook assembly with portions broken away;

FIG. 5 is a sectional view taken along the line 5—5 of FIG. 2;

Figure 6:
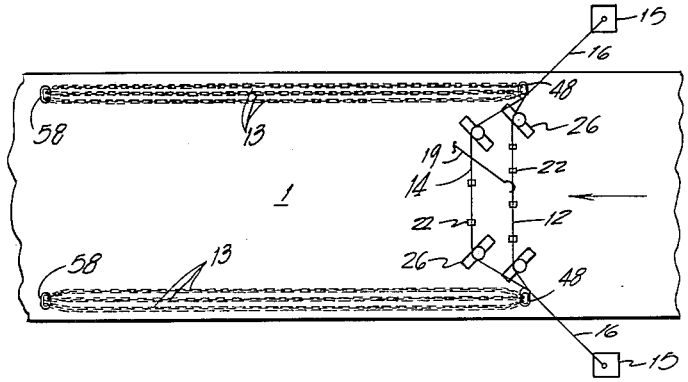
Figure 7:
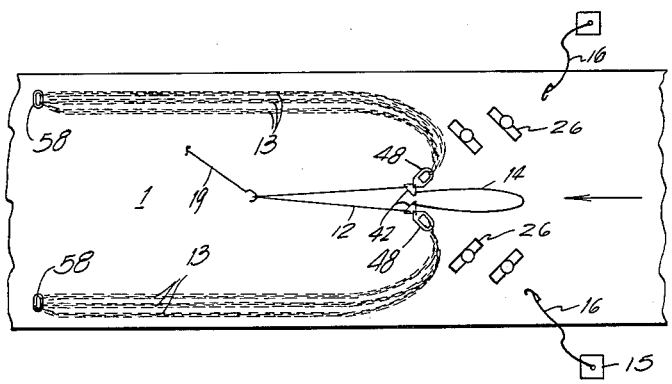
Figure 8:
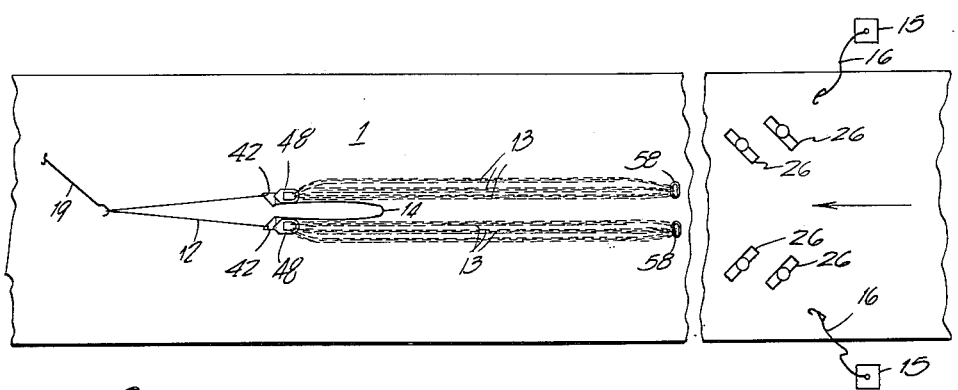

FIGS. 6, 7, and 8 are schematic illustrations showing the sequential operation of the invention;

FIG. 9 is a second embodiment of the invention adapted for bi-directional arresting.

Figure 1:
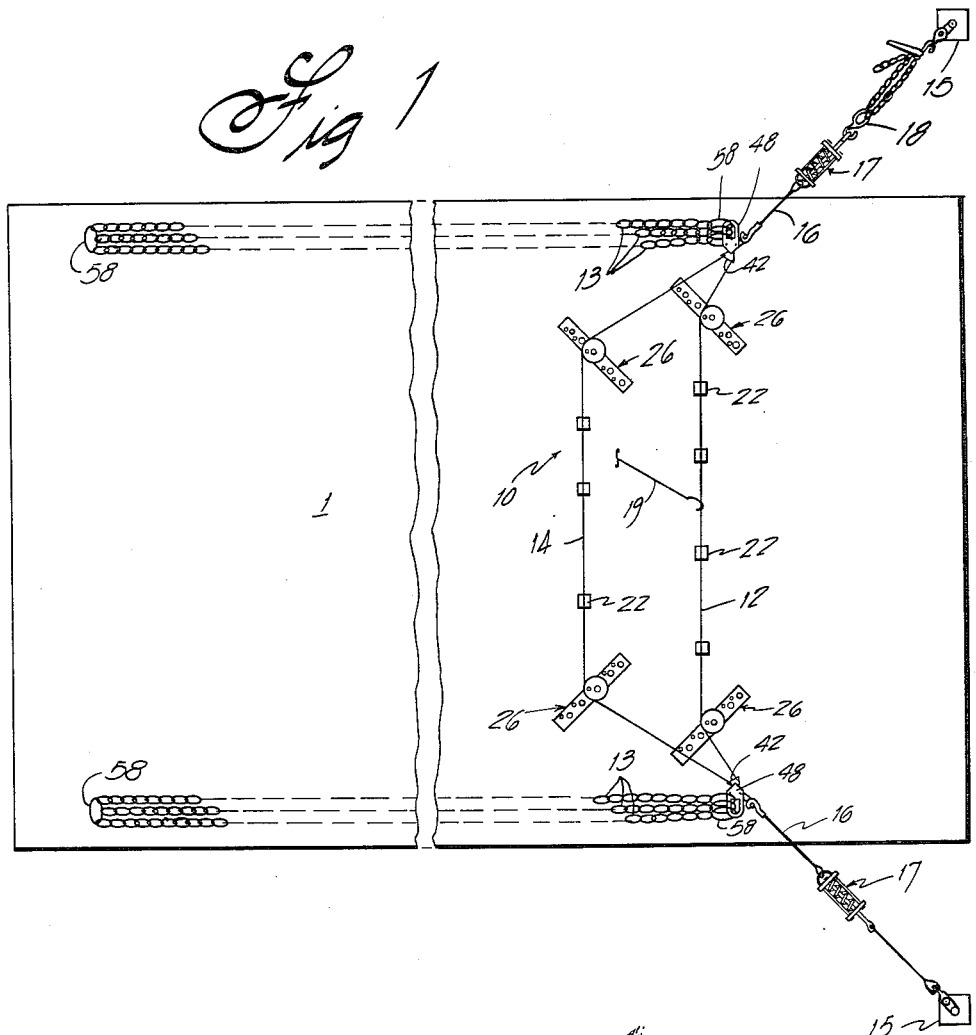
FIG. 1 is a plan view showing the invention, with some parts broken away, utilizing a double pendant.

Referring to the drawing, the landing surface or runway 1 is depicted, in FIG. 1, as being provided with the emergency arresting gear of the invention, generally indicated at 10. The installation is located at the end of the runway and permits arrestment of aircraft moving in one direction, which is that shown by the arrow. Hereinafter this direction is referred to as the direction of arrest or upstream and the opposite direction, as downstream.

In the arresting gear, broadly, there are a pair of pendants 12 and 14 crossing the runway, flexible weights or link chains 13, for providing arrestment resistance, coupled to the pendants, and anchors 15 and 15 to which the pendants are secured in position through anchor cables 16 and 16 and static tensioners 17 and 17. There is also a take-up device 18 in one of the anchor cables for adjusting pendant tension.

In detail, the pendants, 12 and 14, are spaced athwart the runway 1 and comprise single wire cables, under tension, that are supported above the runway by yielding elements or pendant supports 22. The height of the pendants is such that they are capable of being caught by an arresting hook on an aircraft. They may be supported, if desired, at a higher elevation so that they can be engaged by the landing wheel struts of an aircraft. The latter position is desirable in instances where the aircraft is not equipped with an arresting hook.

Although the aircraft normally engages the first or downstream pendant 12, as shown by hook 19, and is halted while so engaged, a second or upstream pendant 14 is used as a safety precaution. The first pendant may be passed over by the aircraft or be broken. Wear, damage in use, arrestment of too heavy or too fast a load may break the first pendant.

Figure 3:
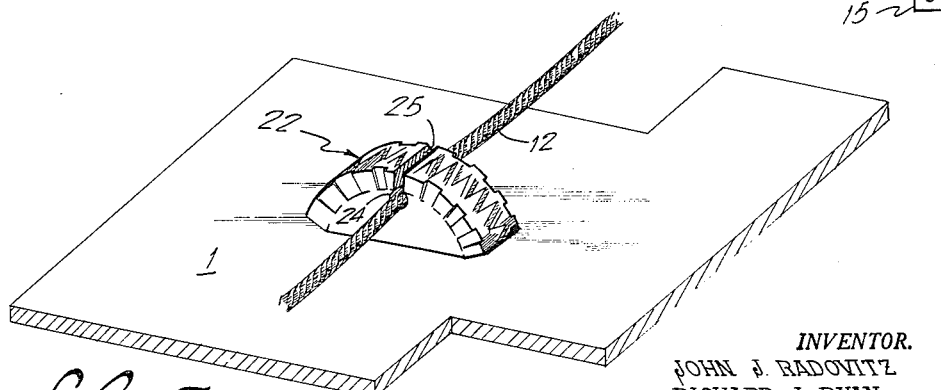
FIG. 3 is an enlarged perspective view of a pendant support used in the invention.

Pendant supports 22 are compressible to facilitate their negotiations by foreign equipment maneuvering in the area. A suitable construction, shown in FIG. 3, is a section of a pneumatic tire having holes 24 in its side walls accessible through a slot 25 in the tread. The tire section sits longitudinally of the runway with its curved surface upward and the pendant is supported in the sidewall holes 20.

Although the pendants 12 and 14 run parallely across the width of the runway, portions near their ends are directed downstream of the arrest direction at suitable angles to cause the ends of both cables on either side of the runway to meet near the runway's edges. Cable direction is obtained by passing it over adjustable retention hook assemblies 26, of which there are two for each pendant.

As shown in FIG. 4, the hook assemblies 26 include a base plate 28 secured between the legs of a number of U-type straps 30 by welds (not shown) or other means. The plate 28 and straps 30 are embedded in the runway to the level of the runway's surface. A plurality of shaft wells 32 extend into the base plate 28 and are accessible from the upper surface. A shaft, 35, secured to the underside of a hook 36, is fitted in one of the shaft wells 32. The hook, 36, of the assembly 26 is preferably a disk having a peripheral groove 38 adapted to receive the pendant so that it can be bent in the desired direction without kinking. A stud 39 in the hook 36 enters a hole 37 in the base plate 28 to secure it against rotation.

The base plates 28 on either side of the runway are parallel to each other, but the members of the pair serving any one cable are pointed outwardly from each other as viewed upstream in the direction of arrest. This construction permits, by shifting the hook 36 to particular shaft wells, a variety of positions for the pendants 12 and 14. The distance between pendants may be increased or decreased, within limits; the effective pendant span between hooks 36 is similarly changed.

The ends of pendants 12 and 14, FIGS. 2 and 5, are furnished with male eye terminals 40. The pendant ends meeting on either side of the runway are joined to a triangular, triple socket cable coupler 42. The latter element has bifurcations or sockets 44 at its corners, FIG. 5, and is penetrated with apertures 43. It receives a pendant terminal 40 in two of its bifurcations 44. A bolt 45 passing through apertures 43 and the eye of terminal 40 secures the two together.

The remaining, or third bifurcation 44, is joined, by a bolt 46, to a chain coupling link 48, which is a device for joining elements approaching it from three different directions. The base, 49, of link 48 (FIG. 2) is triangularly shaped and reduced in thickness at its apex for entering the bifurcation of cable coupler 42, FIG. 5, and is provided with an aperture for receiving bolt 46. The forward portion of link 48 is a U-shaped eye 50, the legs of which are joined to base 49. At the junction between the legs and base both sides of the link 48 have slots 52 penetrated by holes 54 and are used for coupling the anchor line to it. There being two slots 52 of which, only one is used at any time, the link 48 is interchangeable for use on either side of the runway.

When chain coupling link 48 is connected to cable coupler 42, the link's eye 50 is pointed upstream longitudinally of the runway. A plurality of chains 13, three shown, are connected to the eye of each link 48 by separable chain links 58. The chains 13 provide the retarding weight to an aircraft which is to be arrested by engaging one of the pendants 12 or 14. The chains are disposed upstream from coupling link 48 longitudinally of the runway and are laid out to avoid loops, zigzagging and slack. In this position, the chain weight is picked up by a link at a time by an aircraft engaging a pendant 12 or 14 as seen in FIG. 6. The length of chains 13 and the number used obviously depends on factors as aircraft weight and speed, arresting distance, chain weight, etc. To decrease whipping tendencies, the upstream ends of chains 13 are joined by a separable link 58, FIG. 6.

The separable links 58 are formed of two similar U-like elements, 60 and 61. A leg of each element is bifurcated and apertured; the other leg end also has an aperture and is reduced for entrance as a male member into a bifurcation. Both elements 60 and 61 are compatably fitted together and joined by bolts 62 and 63 passing through the apertures.

A hook 64, apertured and suitably dimensioned, fits into slot 52 in the outer side of chain link 48 and is secured by a bolt 66. The jaw end of the hook 64 grasps a shear bolt 68 held in a cable hook 70 fastened to one end of an anchor cable 16. As seen in FIG. 1, the anchor cable 16 to the left of the runway, looking in an upstream direction, is connected through a static tensioner 17 and a conventional shackle 72 to an anchor 15. The anchor 15 is preferably a block of concrete with an extending eye bolt which is buried to the side of the runway.

The static tensioner 17 comprises a spring 74 (FIG. 2) held between two disks 75 and 76 provided with center holes and a pair of outer holes. A U-bolt 78 passes through the outer holes and is fitted with nuts 80 on its leg ends. An eye bolt 82 is seated in the center holes and held in position also by a nut. An end of the anchor cable 16 and a shackle 81 are fastened to the bight of the U-bolt 78 or the eye of eye bolt 82, respectively, in order that a tension force applied through them places the spring 74 into compression.

The anchor cable 16 on the opposite side of the runway is similarly connected except that a take-up device 18 is interconnected between the static tensioner 17 and shackle 81. In FIG. 2, the take-up device 18 is shown to be in the form of a conventional chain jack. Through its operation both pendants 12 and 14 may be drawn up to any desired tension. The static tensioners 17 maintain the tension while permitting some play in the pendants.

With the device installed as shown in FIG. 6, a hook 19 from an aircraft to be arrested engages one of the pendants 12 or 14, and most commonly the downstream pendant 12. The energy of the moving aircraft is transmitted through the pendant to the anchor cable causing them to separate from each other at the shear bolts 68 and 68. The continued forward motion of the aircraft carries the pendants with it while the chain is payed out gradually, progressively increasing the mass pickup. This results because its downstream end is picked up with the pendants and carried toward its upstream ends, as shown in FIG. 7. This added weight dissipates the energy of the moving plane, otherwise the full length of the chain is payed out as in FIG. 8 and the friction of the chain with the runway completes the arrestment.

Heavy ice coverage of the runway will reduce friction between the chain and the runout surface. In this instance, an increase of runout distance or the use of cinders will alleviate the problem. Thin ice coverage has little effect, since the chain breaks up the ice. The effect of freezing of the chain to the runway or of links to each other has been found to be negligible.

If the gear cannot be installed near the end of the runway due to limited available overrun, it may be modified, as illustrated in FIG. 9, for two-directional installation in the center of a runway. This device differs from that described in that a second set of pendants, anchors, etc., which are identified with the same numerals but primed, are provided at the other end of the chains 13. Both ends of the chains 13 may thus be coupled to a set of pendants and an arrestment made by engagement with a pendant of either set. However, it is preferred to use only the pendants on the approach side of the gear and removing those on the other or upstream end of the chain, since failure of the aircraft to engage the first set of arresting pendants would possibly result in engagement of the arresting cable at the upstream end with consequent cable failure. For landings in the opposite direction, the reversed procedure is followed.

Obviously many modifications and variations of the present invention are possible in the light of the above teachings. It is therefore to be understood that within the scope of the appended claims the invention may be practiced otherwise than as specifically described.

What is claimed is:

1. An aircraft arresting gear for a runway comprising a plurality of arresting cables extending parallely to each other and transversely of said runway with their ends near each side thereof; a direction hook for each end of said arresting cables engaged thereby and directing the ends of said arresting cables on each side of said runway to a common point downstream from the direction of arrestment and adapted to permit disengagement from said arresting cables with movement thereof in the direction of arrestment; a plurality of chains on each side of said runway disposed longitudinally thereof in the direction of arrest and upstream of said arresting cables with their downstream ends near said common points; a cable coupler connecting the ends of said arresting cable together on each side of said runway; a link coupler secured to said cable coupler and the downstream ends of said chains on each side of said runway; and an anchoring assembly for each side of said runway comprising an anchor, an anchor cable, a static tensioner and a shear coupling, joined together and connecting said link coupler to said anchor.

2. The gear of claim 1 including an adjustable tensioner for one side of said runway for applying a predetermined tension to said arresting cable.

3. In an arresting gear having an arresting cable extending transversely of a runway, hook means for diverting the direction of said cable comprising a base plate having a plurality of pairs of holes therein, a plurality of U-shaped straps, said base plate being secured between the legs of said straps and adapted to be secured in said runway thereby, a disc like hook having a groove in the periphery thereof for receiving said cable and means for entering one of said pairs of holes and securing said hook thereto.

4. A bi-directional aircraft arresting gear for a runway comprising a chain disposed longitudinally and on each side thereof, a first pair of arresting cables disposed intermediate the ends of said chains extending transversely of said runway for arrestments in one direction, a second pair of arresting cables disposed intermediate the ends of said chains extending transversely of said runway for arrestments in a second direction, a direction hook for each end of each of said arresting cables in engagement therewith and disengageable in an arrestment, an end of each arresting cable of each of said pairs being directed by said directing hook to an end of a chain, means connecting an end of each arresting cable of each of said pairs with an end of a chain, and an anchoring assembly for each end of a chain comprising an anchor, an anchor cable, a static tensioner and a shear coupling, joined together and connecting the end of a chain to said anchor.

References Cited in the file of this patent

UNITED STATES PATENTS

| 1,306,860 | Smith | June 17, 1919 |
| 2,731,219 | Cotton et al. | Jan. 17, 1956 |
| 3,010,683 | Cotton | Nov. 28, 1961 |

FOREIGN PATENTS

| 569,149 | Great Britain | May 7, 1945 |